(12) United States Patent
Koutsogiannis et al.

(10) Patent No.: US 8,004,464 B2
(45) Date of Patent: Aug. 23, 2011

(54) MULTIPLE OBJECT LOCALISATION WITH A NETWORK OF RECEIVERS

(75) Inventors: Grigorios Koutsogiannis, Bordon (GB); Wojciech Machowski, Guildford (GB)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/863,563

(22) PCT Filed: Jan. 16, 2009

(86) PCT No.: PCT/EP2009/050498
§ 371 (c)(1),
(2), (4) Date: Jul. 19, 2010

(87) PCT Pub. No.: WO2009/090246
PCT Pub. Date: Jul. 23, 2009

(65) Prior Publication Data
US 2010/0295723 A1  Nov. 25, 2010

(30) Foreign Application Priority Data
Jan. 18, 2008 (EP) .................................... 08000977

(51) Int. Cl.
*G01S 3/02* (2006.01)
(52) U.S. Cl. ........................................................ 342/453
(58) Field of Classification Search .................. 342/453
See application file for complete search history.

(56) References Cited

U.S. PATENT DOCUMENTS

| | | | |
|---|---|---|---|
| 3,766,552 A * | 10/1973 | Hajduk | ............................ 342/37 |
| 4,499,468 A | 2/1985 | Montana et al. | |
| 4,621,267 A | 11/1986 | Wiley | |
| 4,670,758 A | 6/1987 | Campbell | |
| 4,806,936 A | 2/1989 | Williams et al. | |
| 4,914,604 A | 4/1990 | Castelaz | |

(Continued)

FOREIGN PATENT DOCUMENTS

WO    WO 00/39643 A1    7/2000

OTHER PUBLICATIONS

Wikipedia Article, "Multilateration", Jun. 23, 2009 version, http://en.wikipedia.org/wiki/Multilateration.*

(Continued)

*Primary Examiner* — Thomas H Tarcza
*Assistant Examiner* — Frank McGue
(74) *Attorney, Agent, or Firm* — Birch, Stewart, Kolasch & Birch, LLP (57) ABSTRACT

A technique is described for determining the correct locations of a plurality of objects by processing signals emitted by a transmitter and reflected by the objects to a plurality of receivers, No angle or elevation information is used. Object-receiver pair time difference of arrival measurements are made to calculate the time difference of arrival between the signals received at each pair of receivers from each object. Hyperbolic localisation is then performed to identify possible locations for each object. Direct-reflected signal time reception measurements are made for each receiver-object pair to calculate the time difference between the reception by the receiver of the direct signal from the transmitter and the signal reflected by the object. The direct-reflected signal time reception measurements are associated with the object-receiver pair time difference of arrival measurements, and the results are used to identify the correct object positions by associating the locations determined by the hyperbolic localisation to the direct-reflected signal time reception measurements.

25 Claims, 10 Drawing Sheets

U.S. PATENT DOCUMENTS

| | | | |
|---|---|---|---|
| 5,327,145 A * | 7/1994 | Jelinek | 342/453 |
| 5,386,370 A | 1/1995 | Woo | |
| 5,739,789 A | 4/1998 | Kronhamn | |
| 5,761,382 A | 6/1998 | Shams | |
| 6,119,013 A * | 9/2000 | Maloney et al. | 455/456.2 |
| 6,184,829 B1 * | 2/2001 | Stilp | 342/387 |
| 6,734,824 B2 | 5/2004 | Herman | |
| 7,170,820 B2 | 1/2007 | Szajnowski | |
| 7,346,345 B2 * | 3/2008 | Ruutu et al. | 455/423 |
| 2002/0196188 A1 * | 12/2002 | Holt | 342/453 |
| 2003/0052821 A1 * | 3/2003 | Holt | 342/453 |
| 2008/0055157 A1 * | 3/2008 | Sahinoglu et al. | 342/450 |
| 2009/0149202 A1 * | 6/2009 | Hill et al. | 455/456.6 |
| 2010/0182200 A1 * | 7/2010 | Finney et al. | 342/378 |

OTHER PUBLICATIONS

Coutts, "3-D jammer localization using out-of-plane multipath," Radar Conference 1998, IEEE, Proceedings of the 1998 IEEE Dallas, Texas, XP010280992, May 11-14, 1998, pp. 219-224.

Davies et al., "Source localization by summing multiple correlator outputs," Spectral Estimation, Underwater Signal Processing. 1990 International Conference on Acoustics, Speech and Signal Processing, XP000146360, Albuquerque, New Mexico, vol. 5, Apr. 3-6, 1990, pp. 2787-2790.

Extended European Search Report in related European Application No. 08000977.2 mailed Jul. 22, 2008.

International Search Report mailed May 4, 2009 in related PCT International Application No. PCT/EP2009/050498.

Scheuing et al., "Disambiguation of TDOA estimates in multi-path multi-source environments (DATEMM)," Acoustics, Speech and Signal Processing, 2006, ICASSP 2006 Proceedings, 2006 IEEE International Conference on Toulouse, France, May 14-19, 2006, XP031101341, pp. 837-838.

Zhao et al., "Wireless Sensor Networks, An Information Processing Approach," The Morgan Kaufmann series in networking, 2004, pp. 25-33, 56 and 120-121.

* cited by examiner

FIG.11 ns from the receivers to generate a second set of time difference measurements comprising a respective measurement for each receiver-object pair defining the time difference between the reception by the receiver of the direct signal from the transmitter and the reception by the receiver of the signal reflected by the object; associating the time difference measurements in the first set with the time difference measurements in the second set; and determining the positions of the objects by relating the calculated intersections of the generated position curves to the time difference measurements in the second set.

MULTIPLE OBJECT LOCALISATION WITH A NETWORK OF RECEIVERS

FIELD OF THE INVENTION

The present invention relates to the unique localisation of a plurality of objects using passive receivers and at least one transmitter.

BACKGROUND

Passive receiver networks are regarded as an accurate and effective technique for the localisation of an RF signal source and/or signal reflecting object. The major advantage of passive receiver networks is that they operate without the need for knowledge of the incoming signal and they do not require transmission of a localisation signal.

The common technique for localizing in passive receiver networks is multilateration, also known as hyperbolic positioning, which is based on the time-difference-of-arrival (TDOA) between the various receivers. As with triangulation, to localise uniquely a single object, a specific number of receivers is required. In passive receiver networks, it is required to maintain a larger number of receivers than objects (for 2-D localisation a minimum of four receivers is required for two or more objects). When this condition is not met, it results in intersections which provide false object positions, without any real substance, which are called "phantoms". It is therefore imperative to remove these phantoms in order to estimate the true location of the objects.

There have been numerous techniques proposed for this "spatial filtering", i.e. the removal of the phantoms in the localisation process using passive networks. However, the solutions are based on angular and elevation measurements, exhaustive processing, hardware alterations and tracking. None of these solutions can be applied to a scenario in which:

- There are no multiple acquisitions, which means that tracking cannot be used.
- The receivers might be stationary; therefore it is impossible to move them in order to identify the phantoms as the intersections that move to a physically impossible position.
- The available receivers do not have the capability of measuring anything else apart from time, so that angular and elevation information is not available.
- Each receiver operates stand-alone and transmits the received signal and/or other related information from the signal and the position of the receiver, to a data processing unit.

SUMMARY OF THE INVENTION

According to the present invention, there is provided a method of determining the positions of a plurality of objects by processing signals emitted from at least one transmitter, reflected by the objects and received by a plurality of receivers, the method comprising: processing the signals from the receivers to generate a first set of time difference measurements comprising a measurement for each object and each group of receivers defining the time difference of arrival between the signals received at each of the receivers in the group from the object; processing the first set of time difference measurements to calculate a respective position curve for each object and each group of receivers on which the position of the object must lie; determining intersections of the generated position curves to generate a plurality of possible positions for each individual object; processing the sig- The present invention also provides an apparatus for determining the positions of a plurality of objects by processing signals emitted from at least one transmitter, reflected by the objects and received by a plurality of receivers, the apparatus comprising: means for processing the signals from the receivers to generate reflected signal time difference of arrival measurements, comprising time difference of arrival measurement for each object and each group of receivers defining the time difference of arrival between the reflected signal received at each of the receivers in the group from the object; processing the reflected signal time difference of arrival measurements to calculate a respective position curve for each object and each group of receivers such that the position curve defines a curve upon which the position of the object must lie; determining intersections of the generated position curves to calculate a plurality of possible positions for each individual object; processing the signals from the receivers to generate direct-reflected signal time reception measurements comprising a respective time measurement for each receiver-object pair defining the time difference between the reception by the receiver of the signal direct from the transmitter and the reception by the receiver of the signal reflected by the object; and selecting from the plurality of calculated positions for each object a single position for the object by relating the plurality of calculated positions to the direct-reflected signal time reception measurements.

The present invention further provides a computer program product to program a programmable processing apparatus to become operable to perform a method as set out above or to become configured as an apparatus as set out above.

An embodiment of the present invention provides unique localisation, i.e. spatial filtering, of multiple objects in a passive receiver network, which:

- Allows the unique identification of an object's position and rejection of the "phantom" position based solely on time measurements using simple passive receivers.
- The minimum amount of receivers required to uniquely identify the position of the objects is three but the embodiment can be extended for more sensors.
- The embodiment is applicable to both 2-D and 3-D scenarios
- There is no additional signal requirements, since the whole procedure is based on the signal provided by the transmitter.
- No assumptions are made on the initial objects' position, and only the values obtained from the localisation are used.
- The embodiment can employ simple receivers as there is no need for hardware changes to the antenna.
- No additional signal acquisition is required because the embodiment can operate on a single snap-shot of the environment—there is no need to track the object.
- There is no need for angular or elevation measurements which increase the complexity and cost of the receiver.
- There is no additional transmission requirement from the receiver's point of view.

BRIEF DESCRIPTION OF THE DRAWINGS

Embodiments of the present invention will now be described, by way of example only, with reference to the accompanying drawings, in which:

FIG. 4, comprising

EMBODIMENTS

The principles of the processing operations performed in this embodiment will be described first. An illustrative example will follow.

As stated above, the localisation technique used in the scenarios investigated are based on time difference of arrival (TDOA). It is not required to know the signal transmitted from the transmitter or the time it was transmitted. Therefore the only available information obtained from a time difference estimation technique, such as correlation, can geometrically correspond to the propagation path distance differences of the signal to the receivers. For convenience, correlation will be used as the standard technique in this embodiment, but alternative time delay estimation techniques could be considered for implementation, such as that described in WO-A-00/39643, for example.

The passive receivers transmit the received signal, which is a combination of the reflections from the objects whose positions are to be determined and the direct signal from the transmitter, or other appropriate information of that signal (such as described in U.S. Pat. No. 7,170,820), to a Centralised Data Processing (CDP) unit. When all the data are collected, standard localisation based on TDOA is performed. The TDOA measurements are obtained from the peaks of the cross-correlation function of a sensor pair i-j. TDOA localisation is based on hyperbolae. A time measurement corresponds to a peak obtained from the correlation $R_{ij}$ of receiver pair i-j, where the correlation function is calculated with respect to the signal received on receiver j. For each one of these time measurement a hyperbola is generated based on the TDOA between the examined receiver i and receiver j. For n number of receivers and using all possible sensor pair combinations, the maximum available number, $h_{max}$, of resulting hyperbolae will be $$h_{max} = \frac{n!}{2(n-2)!} \quad (1)$$

for each individual object. Furthermore, for each individual object, the hyperbolic localisation will provide two valid intersections. A valid intersection is an intersection resulting from $h_{max}$ hyperbolae crossing at that point (or region in case of noise). Therefore, there will be 2*(v+1) valid intersections, where v is the number of objects. The reason v+1 is used, is based on the fact that the transmitter is also treated as an object at this stage. Nevertheless, since its position is known to the CDP unit and the receivers, it can be uniquely identified. The final stage of the localisation is to identify the pairs of intersections corresponding to each individual object, as the intersections which are generated from $h_{max}$ hyperbolae. If an intersection comprises of less than $h_{max}$ hyperbolae, it is disregarded.

Geometrically, both resulting valid intersections of a single object share the same geometrical properties compared to the respective receivers i, j and the resulting hyperbolae. Since the intersections are points of a hyperbola, the difference of the distances between any of these two intersections and foci points (receivers i and j) are the same. Therefore, this cannot be used to extract the true objects position.

The only other information which can be obtained without any extra hardware or additional received signals is the auto-correlation of $R_{jj}$ for any receiver j. The resulting feature will provide with a relative time measurement for a particular receiver. This cannot be used directly for localisation purposes as the time difference measured from $R_{jj}$ is not directly linked to the distance to the object. Nevertheless, it can provide a numerical value $T_{Aj}$ for the time measurement based on the following equation:

$$T_{Aj} = \frac{(D_{TA} + D_{Aj}) - D_{Tj}}{c} \quad (2)$$

which will only provide the relative difference between the transmitter signal direct path to the receiver j and the route reflected from the object A, $D_{Tj}$ is the distance of the transmitter to receiver j, $D_{TA}$ is the distance of the transmitter to object A, $D_{Aj}$ the distance from object A to receiver j and c the speed of light. The auto-correlation feature will have a peak at relative time zero, which will correspond to the direct path from the transmitter since this is the one that will arrive first. The remaining peaks will correspond to the path from the reflected objects as given in equation (2). Generating equation (2) for each object and from each receiver will provide the additional information to uniquely identify the position of the object. Assuming a second object B, auto-correlation from receiver i, $R_{ii}$, will give a numerical value for $T_{Bi}$ corresponding to the equation $$T_{Bi} = \frac{(D_{TB} + D_{Bi}) - D_{Ti}}{c} \quad (3)$$

The notation follows the pattern described in the previous equation. Depending on the number of objects and receivers in the scenario examined, it is possible to generate more equations similar to (2) and (3).

The problem now is that the peaks of the auto-correlation function of any receiver cannot be directly associated to a particular object. The cross-correlation function provides the TDOA measurements $T_{ij}$ for an object which cannot be directly related to the time measurements provided by the autocorrelation function of the i or j receivers. Assume now that, from receiver pair i-j, labelled as n, there is a TDOA measurement value $\tau_{vn}$ which corresponds to object v. This value can be written as $$\tau_{vn} = \frac{D_{Aj} + D_{Ai}}{c} \quad (4)$$

Having numerically established all the values for the time measurement $T_{vk}$, where k is the $k^{th}$ receiver, a vector is generated based on the combination of the values $T_{vi}$-$T_{vj}$. Then, based on the valid intersections provided by the TDOA localisation, the following function is used to generate a vector:

$$T_{hyp\_dif} = T_{vi} - T_{vj} = \frac{D_{Tj} - D_{Ti} + (D_{inti} - D_{intj})}{c} \quad (5)$$

where $D_{inti}$ is the distance of the valid intersection of object v selected from receiver i and $D_{intj}$ is the distance of the same valid intersection of the same object to receiver j. The component $D_{inti}$-$D_{intj}$ is the same regardless of selecting the true or phantom location of the object (because of the properties of a hyperbola and its foci points), and in the time domain corresponds to the TDOA measurement $\tau_{vn}$ obtained using cross-correlation on the $n^{th}$ pair of receivers. Therefore, by selecting any intersection of a particular object, it is possible to calculate $T_{hyp\_dif}$ for each object. Then, by comparing the values of $T_{hyp\_dif}$ and the numerical values obtained from $T_{vi}$-$T_{vj}$, it is possible to associate the auto-correlation peaks with the TDOA measurements from cross-correlation from the receiver pairs. The technique described above shows that it is possible to associate the time measurements of auto-correlation to the TDOA measurements of cross-correlation but it is by no means the sole method to achieve this. For example, there are alternative techniques that can be used which are well known to those skilled in the art, such as circular error probable, rms based techniques, etc.

Having established this relationship, it is now possible to relate the valid intersections (true or phantom) with specific time measurements from auto-correlation. A testing function is generated as shown below (example assuming two objects, and three receivers):

$$T_{A1} + T_{A3} - T_{B2} = \frac{\alpha}{c} \quad (6)$$

where $T_{B2}$ is the auto-correlation time measurement for object B from receiver 2, $T_{A1}$ is the auto-correlation time measurement for object A from receiver 1 and $T_{A3}$ is the autocorrelation time measurement for object A from receiver 3. Since these values are known, the $\alpha/c$ number will be known as well, which will be called an objective number herein. Then, a list of all possible combinations of potential objects' positions is generated, which in this case will be four, namely Int $A_1$-Int $B_1$, Int $A_1$-Int $B_2$, Int $A_2$-Int $B_1$, and Int $A_2$-Int $B_2$, where Int corresponds to a valid potential intersection, the letter A or B corresponds to object A or B and the number to the potential position for that object. Then a function from the left-hand side component of equation 6 is formed, which is called the hypothesis function H($pos_1$,$pos_2$), $$H(pos_1, pos_2) = \frac{\left(\begin{array}{c} D_{T2} - D_{T1} - D_{T3} + 2*D_{Tpos_1} - D_{Tpos_2} + \\ D_{pos_1 1} - D_{pos_1 2} + D_{pos_1 3} \end{array}\right)}{c} \quad (7)$$

The above example corresponds to equation 6, where $pos_1$ is the hypothesised position for object A, $pos_2$ is the hypothesised position from object B, $D_{Tn}$ is the distance of the transmitter to receiver n, $D_{Tposv}$ is the distance of the transmitter to hypothesised position of object v and $D_{posvn}$ is the distance of the hypothesised position of object v from receiver n. By selecting $$\min\left[\frac{\alpha}{c} - H(pos_1, pos_2)\right] \quad (8)$$

the combination of the true position of object A and the true position of object B is revealed.

In the case of more objects, equivalent functions to equations (6) and (7) have to be generated. In the case where more receivers are available, they could be incorporated in the equations but that is not essential. Checking each component individually with the time measurement obtained from the auto-correlation functions of each receiver, it will introduce an error in the case of symmetrical scenarios. Therefore, by cross-checking measurement from different receiver and different objects, the probability of a completely symmetrical case is reduced. Furthermore, the above functions are only illustrative and more complex ones can be generated. Nevertheless, the main point to note here is to avoid containing only components such as $D_{Aj}$-$D_{Ai}$ because for both the true and phantom intersection of that object the result is the same. Therefore, the hypothesis and testing function must be generated by cross-combining time measurements from different objects and different receivers. The major points to note with the processing described above area

- Good time difference estimation techniques should be available and short pulses from the transmitter would be advantageous for this purpose to avoid interleaving with received pulses from reflections. Nevertheless the processing can operate in noisy environments without specially designed signals, as it is based on the provided intersections.
- No need for extra signals to be transmitted from the receivers to the CDP unit.
- No need for additional types of measurements (angle, elevation, etc).
- No need for complex hardware additions.
- The hypothesis function shown earlier is linear and based on difference and summation of distances.
- Flexibility of combinations of receivers and objects for the hypothesis function and objective number.
- Solutions are unique as they are based on unique positions in space.
- Accuracy can be improved by designing dedicated hypothesis functions.
- The processing can be applied to 3-D problems, without significant changes to its structure as it is based on ranges and time measurements.
- The processing is applicable to more than 2 objects scenario, where the testing function which will incorporate time measurements for the added objects.

If more than three receivers are used for the localisation, or are available, it is possible to use them in the testing and hypothesis functions. Nevertheless, based on the function discussed above, only three receivers are necessary. Therefore, the optimum three receivers can be selected to minimise the probability for error.

The processing can be applied to both centralised, distributed or any other hybrid architecture localisation networks.

Figure 1:
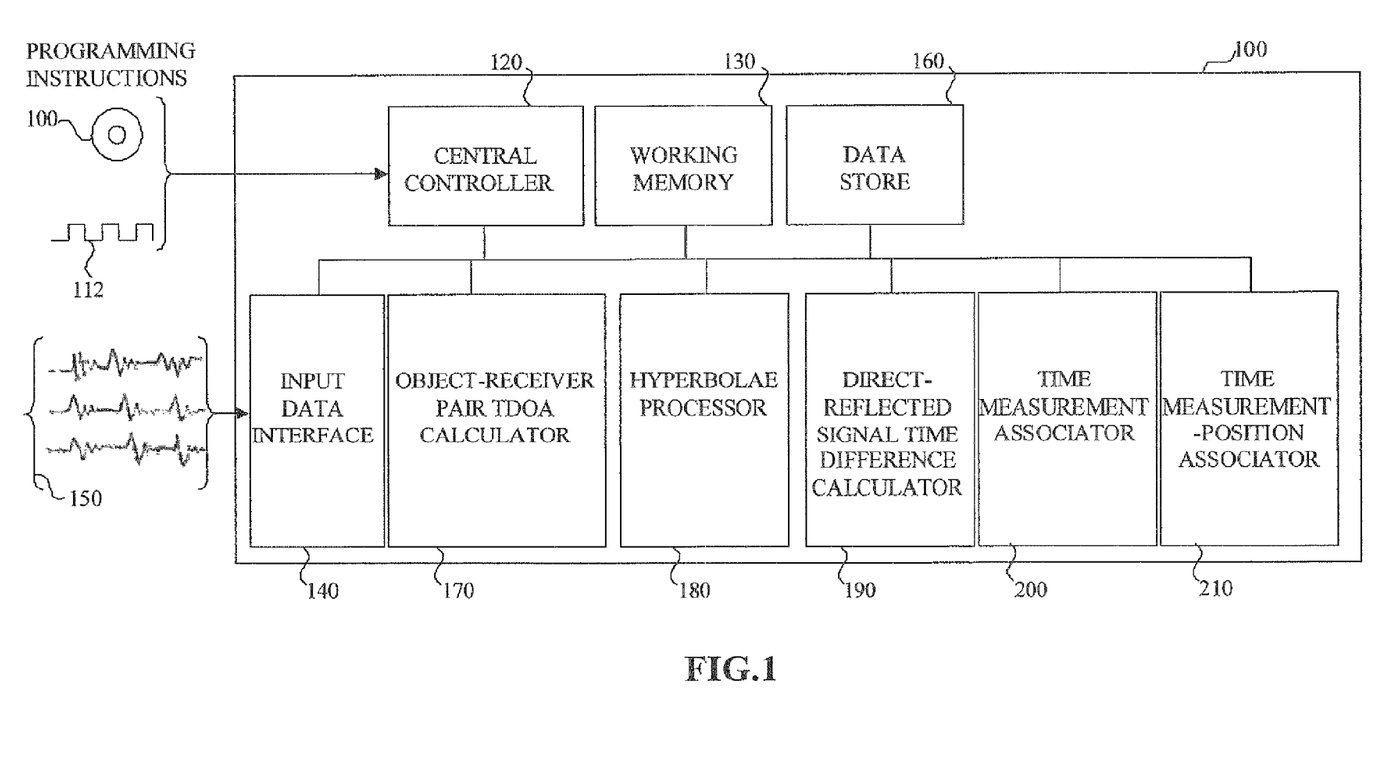
FIG. 1 is a block diagram showing the functional units in a signal processing apparatus of an embodiment.

FIG. 1 shows a block diagram of an embodiment of a CDP unit 100 for performing processing operations based upon the principles described above.

Referring to FIG. 1, a central controller 120 is operable to provide control and coordination of the other functional units. Working memory 130 is provided for use by the central controller 120 and the other functional units.

Input data interface 140 is operable to receive the signals 150 transmitted to the CDP unit 100 from the receivers, and is further operable to control the storage of data defining the signals in data store 160.

Object-receiver pair TDOA calculator 170 is operable to process the signals from the receivers to generate time difference of arrival measurements, each of these comprising a measurement for a respective object and a respective pair of receivers which defines the difference between the time of arrival of the signals from the object at each of the receivers in the pair.

Hyperbolae processor 180 is operable to perform hyperbolic localisation for the objects based upon the time difference of arrival measurements generated by object-receiver pair TDOA calculator 170. More particularly, hyperbolae processor 180 is operable to calculate a respective hyperbola for each object and each pair of receivers such that the positions of the receivers comprise the foci points of the hyperbola, and the hyperbola itself comprises a line upon which the position of the object must lie. Hyperbolae processor 180 is further operable to calculate the intersections of the hyperbolae and identify therefrom the intersections corresponding to possible positions of each individual object.

Direct-reflected signal time difference calculator 190 is operable to process the signals from the receivers to calculate a direct-reflected signal time reception measurement for each receiver-object pair which defines the time difference between the reception by the receiver of the direct signal from the transmitter and the reception by the receiver of the signal reflected by the object. Direct-reflected signal time difference calculator 190 is operable to perform processing in accordance with the principles described above with reference to equations (2)-(4).

Time measurement associator 200 is operable to perform processing to associate the time difference of arrival measurements calculated for the object and each pair of receivers by object-receiver pair TDOA calculator 170 with the direct-reflected signal time reception measurements calculated for the receiver-object pairs by direct-reflected signal time difference calculator 190. Time measurement associator 200 is operable to perform processing in accordance with the principles described above with reference to equation (5).

Time measurement-position associator 210 is operable to perform processing to associate the possible object positions determined by hyperbolae processor 180 with the direct-reflected signal time reception measurements calculated for the receiver-object pairs by direct-reflected signal time difference calculator 190. Time measurement-position associator 210 is further operable to determine the correct positions for the objects based upon this processing. Time measurement-position associator 210 is operable to perform processing in accordance with the principles described above with reference to equations (6)-(8).

The functional units shown in FIG. 1 may be implemented as hardware units and/or as units resulting from the programming of a programmable processing apparatus. In the case of a programmable processing apparatus, the apparatus may be programmed to operate in accordance with computer program instructions input, for example, as data stored on a data storage medium 110 (such as an optical CD ROM, semiconductor ROM, magnetic recording medium, etc.), and/or as a signal 112 (for example an electrical or optical signal) input to the programmable processing apparatus, for example from a remote database, by transmission over a communication network such as the internet, or by transmission through the atmosphere.

An illustrative example will now be described for a better understanding of the processing in an embodiment. This particular example will depict a scenario with the minimum amount of objects and receivers (RF receivers) that the system may be faced with. It is assumed that pre-filtering and optimum techniques are used to provide accurate time measurements from both cross and auto-correlation functions without large ambiguities resulting from noise or the motion of the object. Nevertheless, the embodiment can operate in the case of noisy measurements since it operates in space but will be biased as the intersection based distance calculations will be impaired by the time measurements.

There are numerous applications where passive localisation is used. Due to the added restrictions concerning the spectrum usage, passive systems are considered as the "greenest" solution to the ever tighter legislation, since they re-use the existing frequency bands. In the example described below, the traffic flow on a motorway is monitored, and it is possible to use existing transmitters of other applications situated at the side of the road. The receivers are distributed along the motorway but do not necessarily follow the curvature of the road. The objective is to increase the Geometric Dilution of Precision (GDOP), as it is known that receivers in straight lines may cause degradation to the localisation accuracy in certain object orientations.

Figure 2A:
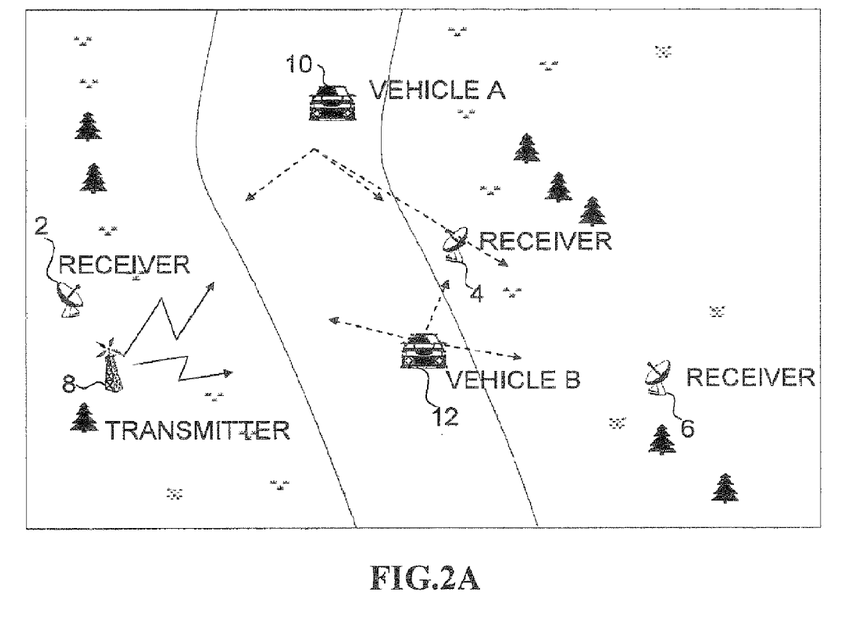
FIG. 2A illustrates an example scenario and FIG. 2B shows the scenario of FIG. 2A in generic schematic form.

The scenario is illustrated at FIG. 2A. Three receivers 2, 4, 6 acquire a signal directly from a transmitter 8. At the same time, two vehicles (objects) 10, 12 reflect the transmitter's signals back to the receivers 2, 4, 6. To minimise the cost and complexity of localisation, only the minimum number of receivers are installed. Additionally, it is possible that receivers could malfunction and could not be used. Therefore, it is necessary to use processing as described in the previous section to remove the phantom intersections resulting from the hyperbolic localisation. The signals are then relayed from the receivers to the CDP unit 100 where the vehicle's position is calculated and the flow and volume of traffic is monitored without the need of optical means. Nevertheless, it is possible to combine the proposed RF system with existing optical systems to complement each other.

Figure 2B:
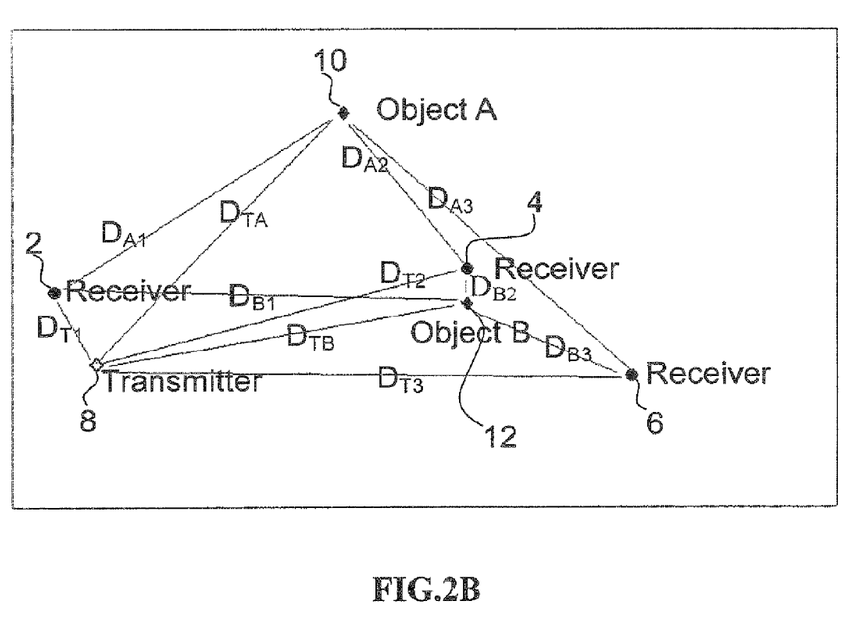

The scenario illustrated in FIG. 2A is converted to a generic schematic form shown in FIG. 2B, where the receivers 2, 4, 6 are presented as circles, the transmitter 8 as a clear diamond and the objects (cars) 10, 12 as solid diamonds. There are three passive receivers 2, 4, 6 distributed in the area under monitoring. For this particular scenario, the receivers are randomly distributed in space. The three receivers 2, 4, 6 are situated at [−90 0], [10 0] and [50 −45]. In the scenario used and illustrated, all the distances and coordinates quoted are in meters. These are passive omni-directional receivers 2, 4, 6 which can only transmit the received signals or other necessary information of the received signals to the CDP unit 100 for the purpose of localisation (centralised architecture). In a case of distributed sensor network, the processing will take place at each receiver 2, 4, 6 individually, so they will require information from each other receiver. The positions of the receivers 2, 4, 6 are known. Furthermore, there is a transmitter 8 which transmits the signals that will be used for the localisation from the receiver network. The position of the transmitter 8 is known to the CDP unit 100. Finally, there are two objects 10, 12 inside the monitoring area positioned as shown in FIG. 2B at [−20 65] and [10 −15]. The system is not aware of the position of the objects 10, 12.

Figure 3:
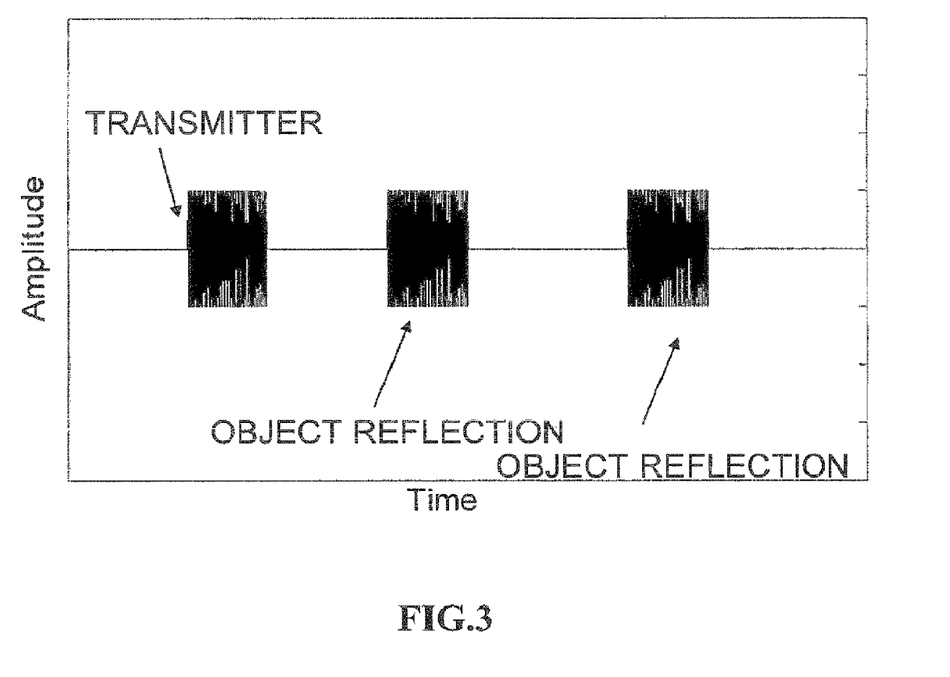
FIG. 3 shows an example form of signal received at a receiver.

In the example, the transmitter 8 transmits a short pulse, although it could be any signal suitable for localisation. Each of the receivers 2, 4, 6 will pick up a signal that will contain the pulse from the direct line of sight, the pulse reflected off object A and the pulse reflected off object B. If the duration of the pulse is shorter that the distance (converted in time), the signal received at any receiver 2, 4, 6 will have the form shown in FIG. 3. The first received pulse will always belong to the transmitter 8 and the subsequent ones to the objects 10, 12. Nevertheless, at this point, it is impossible to associate a pulse with a particular object. This signal is then transmitted to the CDP unit 100, since the present embodiment comprises a centralised architecture network.

Figure 4A:
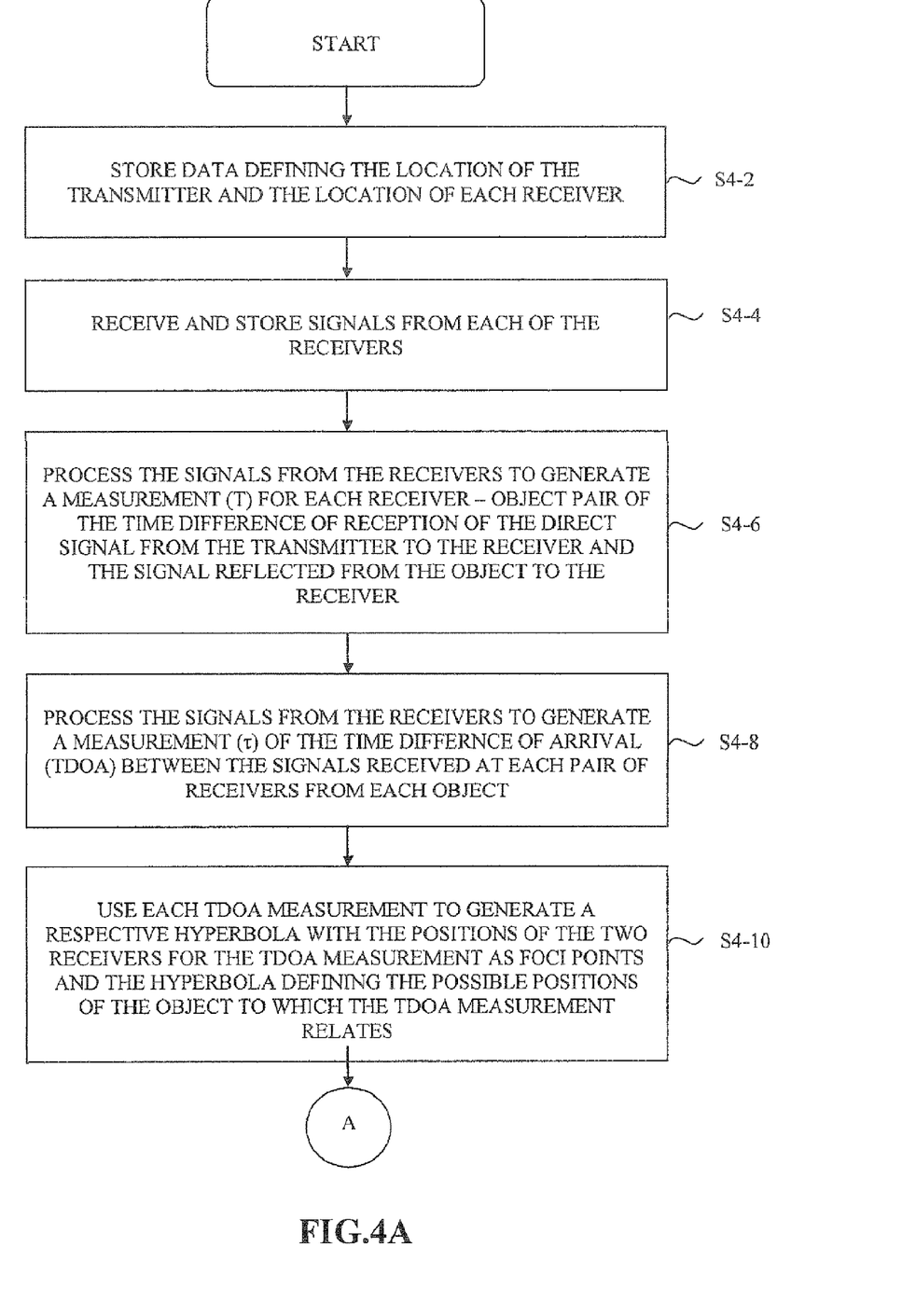
FIGS. 4A and 4B, is a flow chart showing the processing operations performed by the apparatus of FIG. 1 in an embodiment.
Figure 4B:
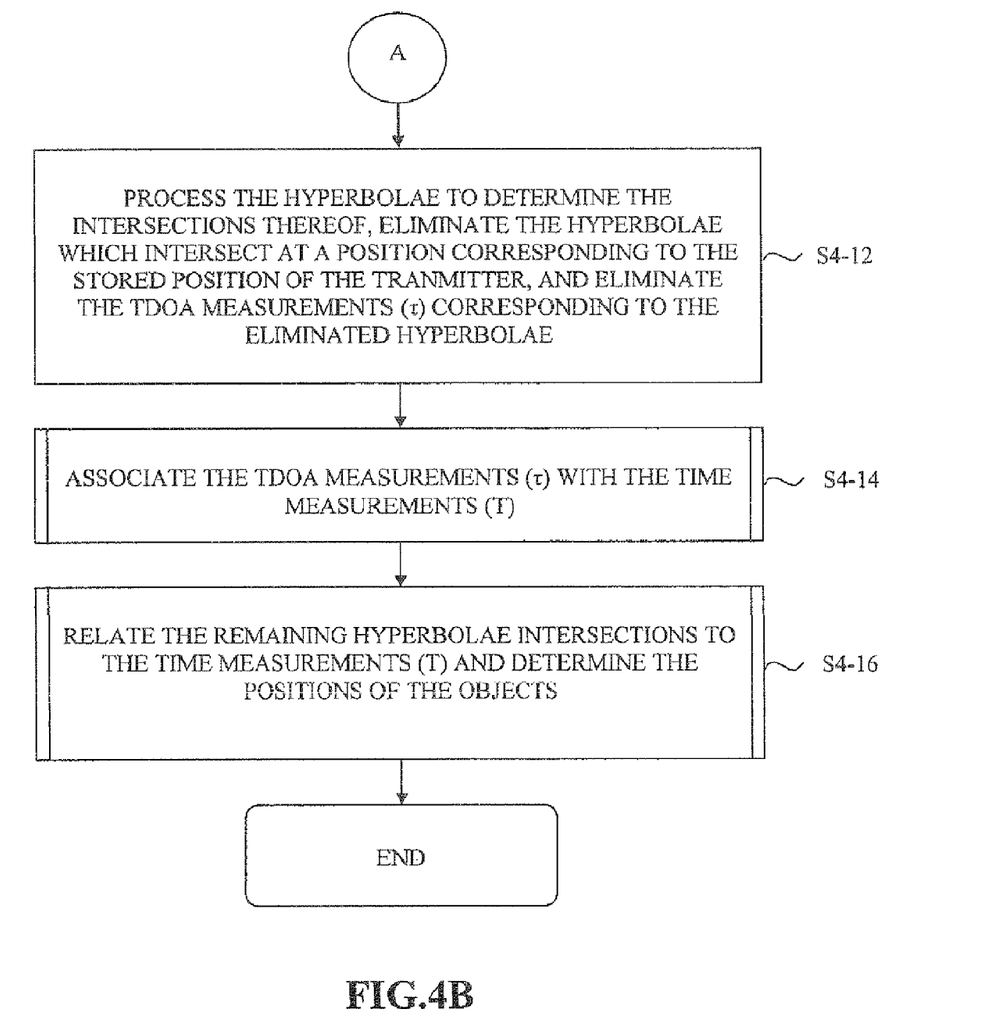

FIG. 4 is a flow chart showing the processing operations performed by CDP unit 100 in this embodiment.

At step S4-2, data is stored in data store 160 defining the location of the transmitter 8 and the respective location of each of the receivers 2, 4, 6.

At step S4-4, input data interface 140 receives the signals 150 transmitted from the receivers 2, 4, 6, and stores data in data store 160 defining the received signals.

At steps S4-6 and S4-8, object-receiver pair TDOA calculator 170 and direct-reflected signal time difference calculator 190 perform processing to find the time measurements required.

The TDOA measurements τ and the direct-reflected signal time measurements T can be found at steps S4-6 and S4-8 using correlation-based techniques or any other process that can be used to determine the time difference between the arrivals of two or more signals, such as for example described in WO-A-00/39643.

Figure 5:
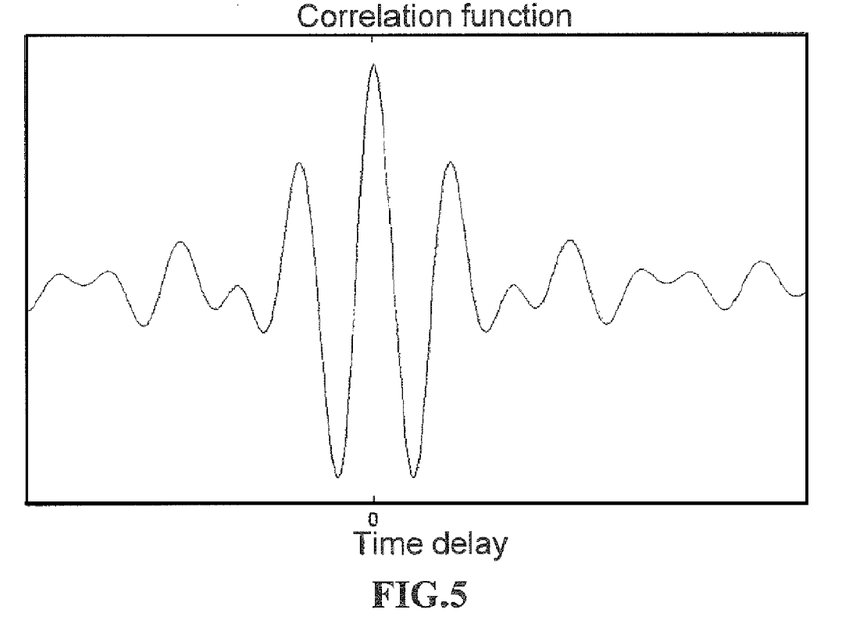
FIG. 5 shows an example of an auto-correlation function for a transmitter signal.
Figure 6:
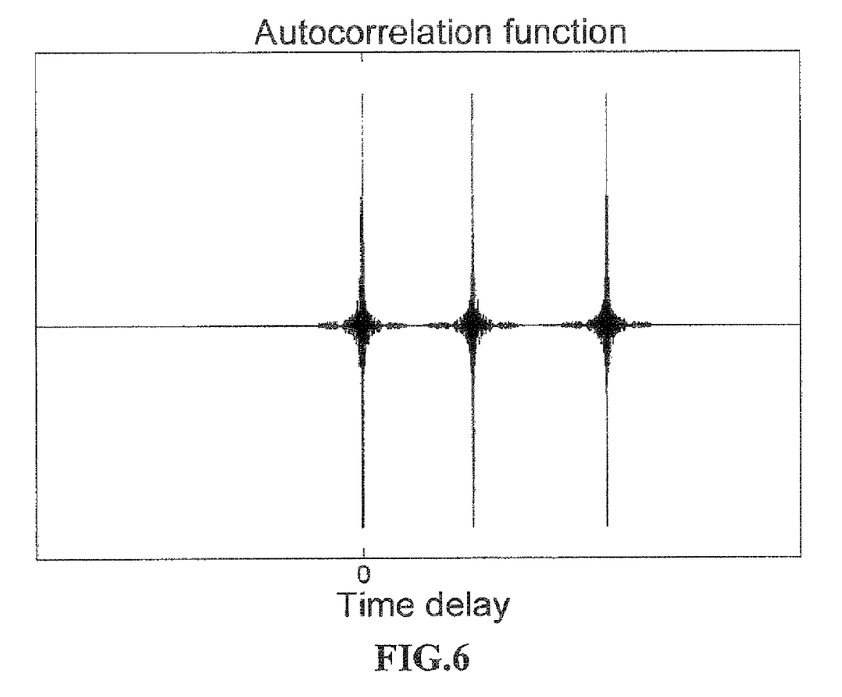
FIG. 6 shows an example of an auto-correlation function of a signal received at a receiver.

In the present embodiment, at step 4-6, direct-reflected signal time difference calculator 190 performs an auto-correlation technique to generate a respective direct-reflected signal time reception measurement for each receiver-object pair. Each of these measurements defines the time difference between the reception by the receiver of the direct signal from the transmitter and the reception by the receiver of the signal reflected by the object. If the transmitter signal is a linear frequency modulated (LFM) pulse, its auto-correlation function will be similar to the one shown in FIG. 5. Nevertheless, the signal observed at each receiver 2, 4, 6 contains all pulses from both direct and indirect paths. Therefore, for the scenario of FIG. 2B, the auto-correlation function of the signal received at receiver i based on the transmitted pulse from the transmitter 8 will be as shown in FIG. 6. As noted previously, the auto-correlation at step S4-6 is performed in the CDP unit 100, but it can be done instead in the receiver. The auto-correlation can be done in various ways. First, the signal can be auto-correlated with its copy, using a conventional technique. However, to improve the quality of the auto-correlation function, in the present embodiment a signal is generated synthetically that imitates the reception of the transmitter's signal at a particular receiver. This is possible because both the distance of the transmitter to the receiver is known and the signal is known or can be acquired. The synthetically generated signal for each receiver is then used to auto-correlate its corresponding receiver. The resulting peaks correspond to the time difference of reception of the direct path signal and the reflected signals, as given from equations (2). For a receiver i, the auto-correlation function will provide the values $T_{Ai}$ and $T_{Bi}$. Nevertheless, for the red explained above, this cannot be used for radial localisation, i.e. to provide direct relation to the distance of the object from the receiver. Accordingly, CDP unit 100 stores all the values from the autocorrelation of each individual receiver for further processing. For the scenario illustrated in this example, the result will be $$T_{vn} = \begin{bmatrix} T_{A_1} & T_{B1} \\ T_{A2} & T_{B2} \\ T_{A3} & T_{B3} \end{bmatrix} \quad (9)$$

where v is the $v^{th}$ object and n is the $n^{th}$ receiver.

Figure 7:
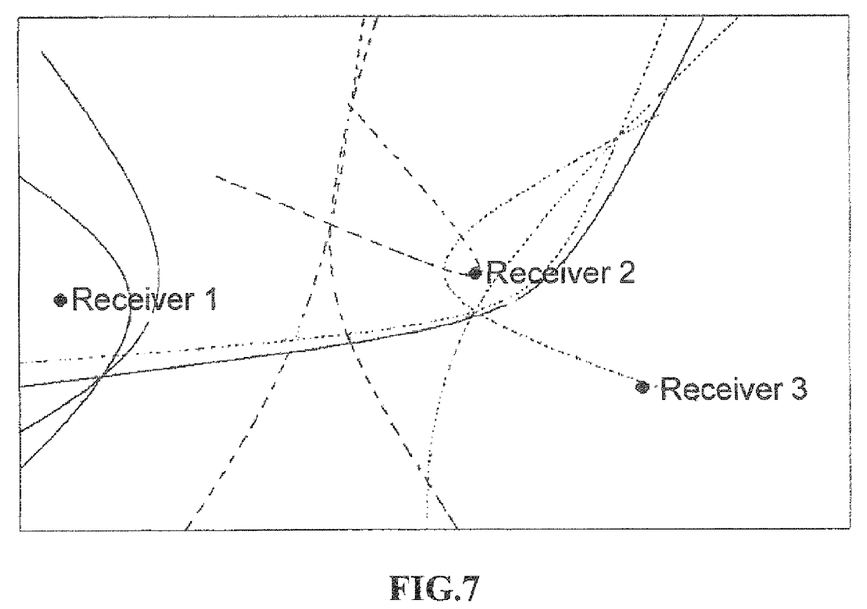
FIG. 7 shows an example of plotted hyperbolae for the scenario illustrated in FIG. 2A.
Figure 8:
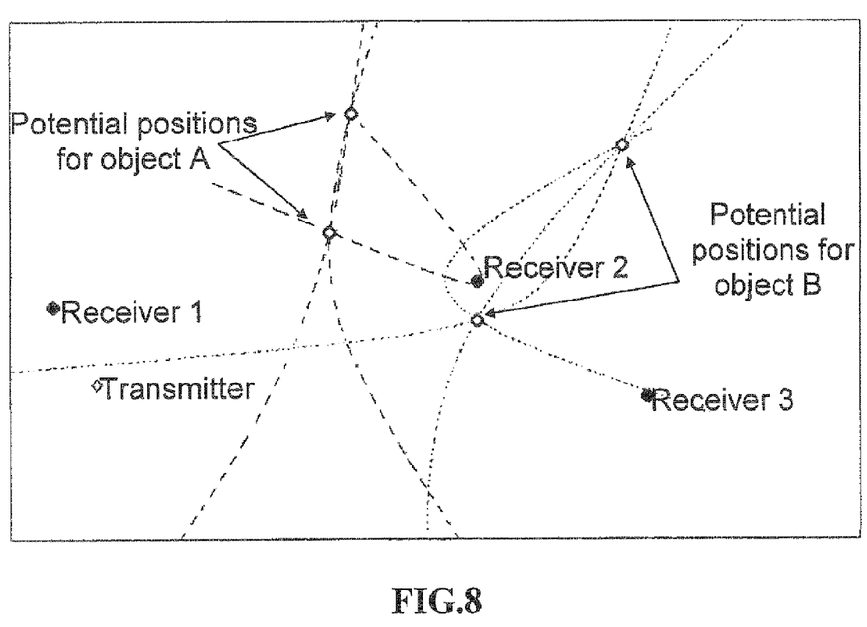
FIG. 8 shows the hyperbolae of FIG. 7 after processing to remove values corresponding to the transmitter.

At steps S4-8 to S4-12, object-receiver pair TDOA calculator 170 and hyperbolae processor 180 perform a standard procedure for hyperbolic localisation. It is required to estimate the TDOA between the signals arriving at receiver pairs. To do that, object-receiver pair TDOA calculator 170 calculates the cross-correlation of the signal of receiver i based on the signal from receiver j. Each TDOA measurement is then used by hyperbolae processor 180 to generate a hyperbola using as foci points the two receivers used from the correlation function. This technique is well known to those skilled in the art (see, for example, "Wireless Sensor Networks, An Information Processing Approach", The Morgan Kaufmann series in networking by F. Zhao, L. Guibas, 2004, ISBN 1558609148). Accordingly, it will not be explained here. Nevertheless, it must be noted that all the possible receiver pairs are used in order to minimise the amount of potential positions (true and phantom intersections) for each object. In this case, the possible receiver pairs are Receiver 1-Receiver 2, where Receiver 2 acts as MASTER, Receiver 3-Receiver 2 (2 as MASTER), and Receiver 3-Receiver 1 (1 as MASTER). The MASTER receiver corresponds to the receiver used to provide the time reference for the calculation of the time difference. From the cross-correlation function at step 94-8, the TDOA time measurements τ will be obtained as:

$$\tau_{vk} = \begin{bmatrix} \tau_{11} & \tau_{21} & \tau_{31} \\ \tau_{12} & \tau_{22} & \tau_{32} \\ \tau_{13} & \tau_{23} & \tau_{33} \end{bmatrix} \quad (10)$$

where v is the $v^{th}$ object and k is the $k^{th}$ receiver pair. It is now required to associate each column to an object. But in order to minimise the iterations required, it is advisable to plot first the hyperbolae in order to find the τ values corresponding to the transmitter. This processing is performed by hyperbolae processor 180 at step S4-12. The hyperbolae plotted from the τ matrix can be seen in FIG. 7. Each of these hyperbolae corresponds to an individual TDOA and can be easily identified. Therefore, it is possible to remove the values corresponding to the transmitter, as it is possible to find which three hyperbolae intersect at the transmitter's position, which is well known and does not require to be spatially filtered. Thus, we are left with the minimum number of hyperbolae and minimum number of intersections, which for this scenario are four, two for each object, as shown in FIG. 8. At the same time, it is now possible to associate each object with its respective TDOA measurement from each receiver pair. The τ can now be re-written as $$\tau_{vk} = \begin{bmatrix} \tau_{A1} & \tau_{B1} \\ \tau_{A2} & \tau_{B2} \\ \tau_{A3} & \tau_{B3} \end{bmatrix} \quad (11)$$

where v is the $v^{th}$ object, and k is $k^{th}$ receiver pair.

Figure 9:
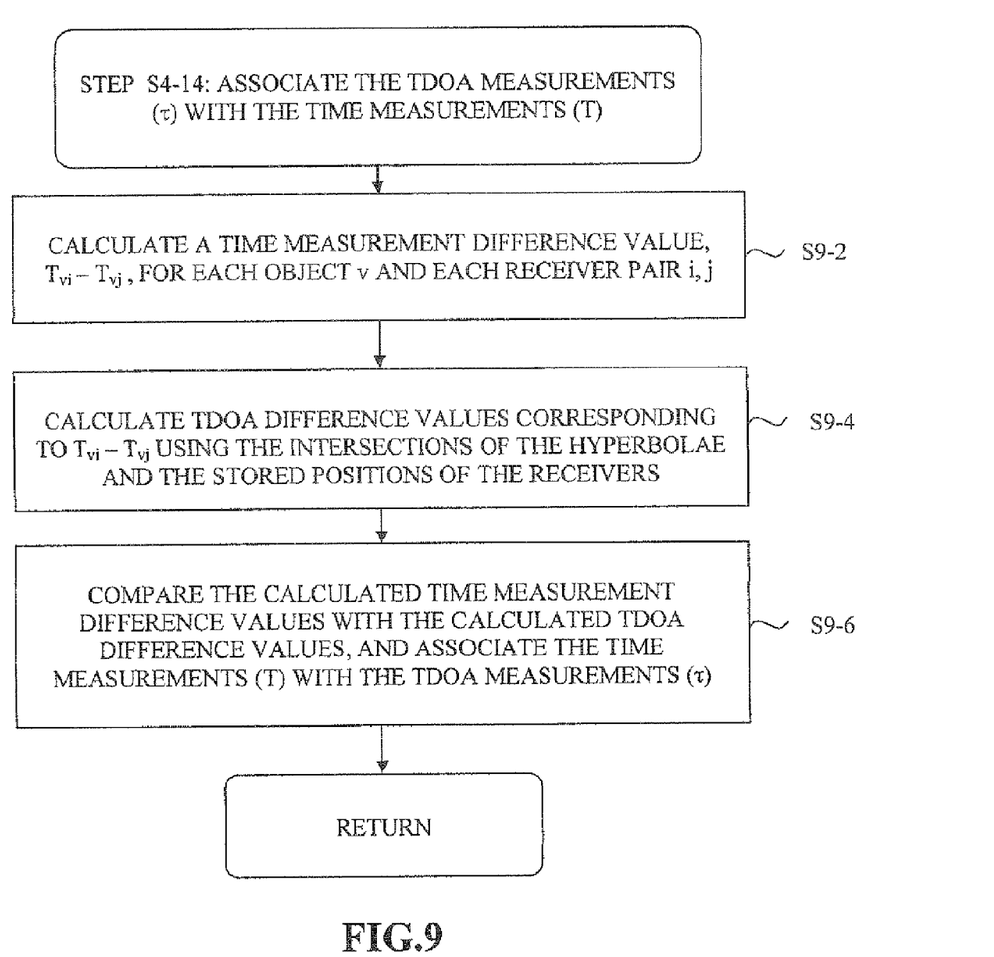
FIG. 9 is a flow chart showing the processing operations performed at step S4-14 in FIG. 4.

At step S4-14, time measurement associator 200 performs processing to associate the TDOA time measurements τ with the time measurements T obtained from the autocorrelation. FIG. 9 shows the processing operations performed by time measurement associator 200 to do this. These processing operations are based upon the principles described previously with reference to equation 5. It is only required to use one of the intersections of a particular object since, in equation 5, the subtraction term in brackets is equal for both the true and phantom position. Furthermore, from the matrix in equation 11, each τ value has been associated with a hyperbola, and therefore with the particular intersections. Thus, it is possible to re-organise the T matrix in such a way as to associate the time measurements with the particular objects. In the absence of any extra information, each possible combination is used, as the first object will be tested against all single receiver peaks, and associated to the closest value, then the second object with the remaining values, and so on so forth.

Figure 10:
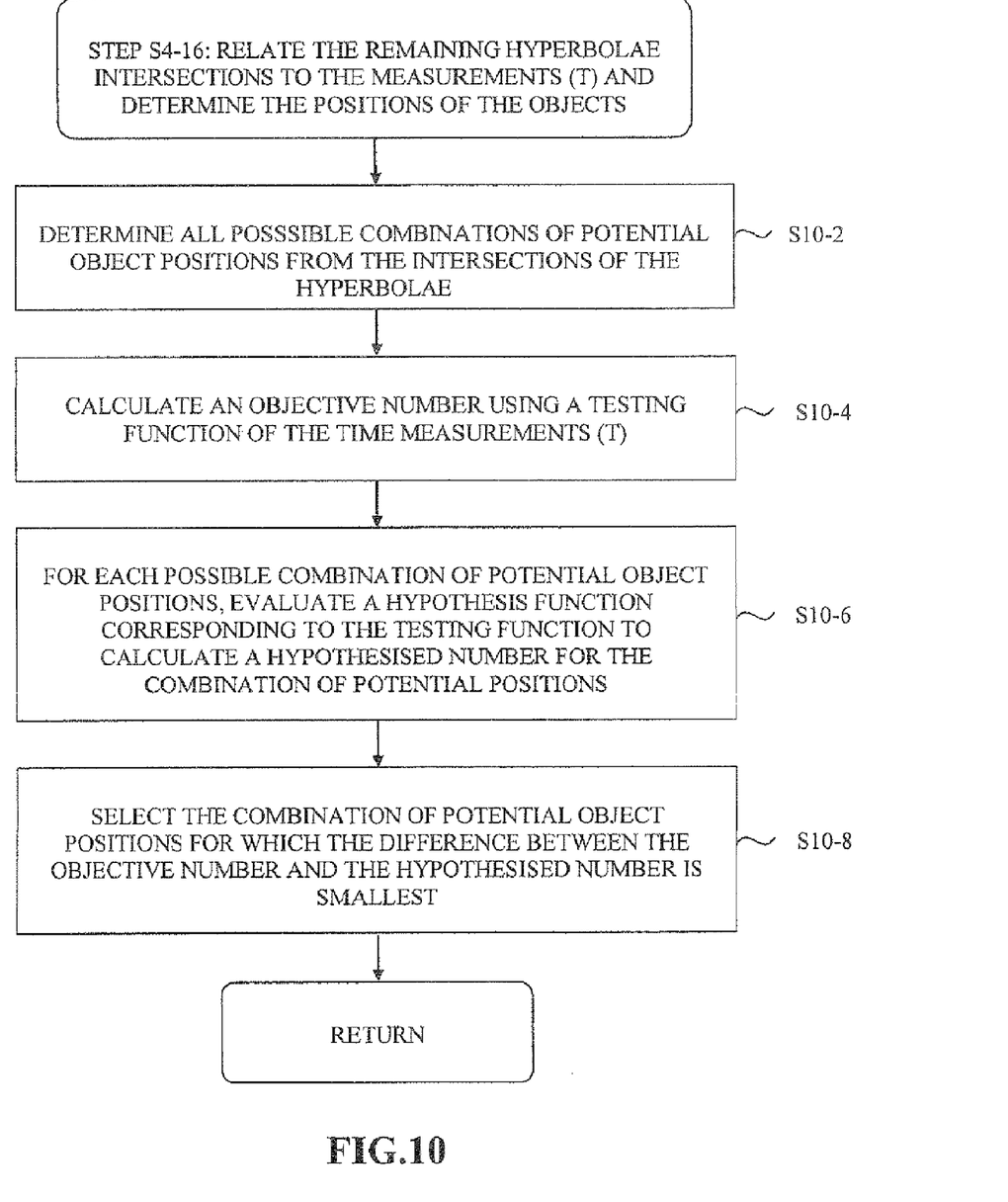
FIG. 10 is a flow chart showing the processing operations performed at step S4-16 in FIG. 4.

Having associated each T value with its corresponding τ value, time-measurement position associator 210 performs processing at step S4-16 to relate the hyperbolae intersections calculated at step S4-12 (defining the possible positions of the objects) to the time measurements T calculated at step S4-6, so as determine the unique, true positions of the objects. This processing is shown in FIG. 10, and is based on the principles described previously with reference to equations (6)-(8).

Figure 11:
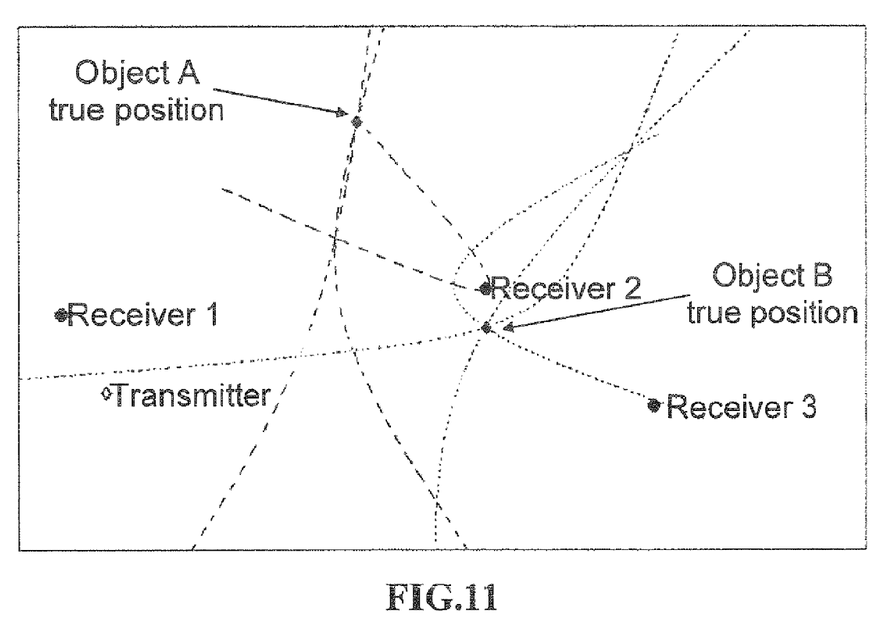
FIG. 11 shows the identity of the true object positions calculated as a result of the processing in the embodiment.

Initially, all the potential object combinations are identified (step S10-2). In this case, there are only four. Note here that the objects cannot be positioned on the same hyperbola twice. Each hyperbola corresponds to the potential positions of a single object. From the numerical values, the testing function in equation 6 is formed (step S10-4) and for each combination of positions the hypothesis function in equation 7 is calculated (step S10-6). The correct object placement will correspond to the combination that minimises function 8, and is selected at step S10-8. Using the above procedure it is possible to uniquely identify the true positions of the objects, as shown in FIG. 11.

Modifications and Variations

Many modifications and variations can be made to the embodiment described above.

For example, in the embodiment described above, a single transmitter 8 is employed. Nevertheless the processing in the embodiment above can be applied when multiple transmitters are available. One way to do that is to select the most preferable transmitter based on the power of the signal, temporal and spectral properties and/or transmitter's availability with the aim to improve the overall accuracy of the object localisation. Furthermore, an alternative approach assumes simultaneous use of all the available transmitters by reconfiguring the testing function so it is cross-combining not only the time measurements from the objects and the receivers but from different transmitters as well. In this case, the time-measurement associator 200 should be upgraded in order to facilitate the processing of multiple signals from various transmitters and allow it (the associator 200) to distinguish between the various signals, following the principle describe in the embodiment above.

The above technique can be developed further to incorporate more objects or more receivers. It should be noted that, in the case of having more than three receivers available for the localisation, it is possible to only use the optimum three following the equation discussed above. However, the extra receivers can still be used by re-arranging the equations accordingly.

Additionally, the processing can be applied to a 3-D scenario. Following the equations explained in the processing analysis, it is clear that only time and distance measurements are used which are not associated directly to whether the scenario examined is two- or three-dimensional. Therefore, applying the processing to a 3-D case can be achieved by incorporating the three-dimensional valid intersections in the processing and obtaining the distance measurements from three- and not two-dimensional coordinates.

It is possible to change the hypothesis and testing function to a more complicated form. This can be achieved by mathematically designing a test function, linear or non-linear, that will reflect the characteristics that are required to remove potential problems from symmetries or maximise the separation between the values obtained for the various combinations of positions.

The processing described above was described in a passive localisation scheme which produces ambiguous objects' locations based on time measurements. Nevertheless, without derailing from the main description of the processing, it is possible to adapt it so that it can be applied to other schemes of passive, active or hybrid localisation schemes. As mentioned earlier, it can be applied to both 2-D and 3-D without changes to the core of the processing.

The invention claimed is:

1. A method of determining the positions of a plurality of objects by processing signals emitted from at least one transmitter, reflected by the objects and received by a plurality of receivers, the method comprising:

processing signals from the receivers to generate a respective object-receiver pair time difference of arrival measurement for each object and each pair of receivers comprising the time difference of arrival between the signals received at each of the receivers in the pair from the object;

processing the generated object-receiver pair time difference of arrival measurements to calculate a respective hyperbola for each object and each pair of receivers with the positions of the receivers as foci points and the hyperbola defining the set of possible positions for the object;

calculating the intersections of the generated hyperbolae and identifying the intersections corresponding to possible positions for each individual object, wherein each possible position is either a true position or a phantom position;

processing signals from the receivers to generate a direct-reflected signal time reception measurement for each receiver-object pair comprising the time difference between the reception by the receiver of the direct signal from the transmitter and the reception by the receiver of the signal reflected by the object;

associating the generated direct-reflected signal time reception measurements with the generated object-receiver pair time difference of arrival measurements to generate measurement association results; and determining the true positions of the objects by relating the calculated intersections of the generated hyperbolae to the generated direct-reflected signal time reception measurements using the measurement association results.

2. A method according to claim 1, wherein the object-receiver pair time difference of arrival measurements are generated by performing cross-correlation of the signals from the receivers.

3. A method according to claim 1, wherein the direct-reflected signal time reception measurements are generated by performing auto-correlation of the signals from the receivers.

4. A method according to claim 1, wherein the processing to associate the generated direct-reflected signal time reception measurements with the generated object-receiver pair time difference of arrival measurements comprises:

combining the direct-reflected signal time reception measurements for the same object, to generate a first set of combined values;

calculating object-receiver pair time difference of arrival combined values corresponding to the direct-reflected signal time reception combined values, thereby generating a second set of combined values; and comparing the first and second sets of combined values to associate the direct-reflected signal time reception measurements with the object-receiver pair time difference of arrival measurements.

5. A method according to claim 4, wherein the direct-reflected signal time reception measurements are combined by calculating, for each object and each pair of receivers, the difference between the direct-reflection signal time reception measurement for the object and the first receiver in the pair and the direct-reflected signal time reception measurement for the object and the second receiver in the pair.

6. A method according to claim 4, wherein the object-receiver pair time difference of arrival combined values are calculated in dependence upon the calculated intersections of the generated hyperbolae.

7. A method according to claim 6, wherein the object-receiver pair time difference of arrival combined values are calculated in dependence upon the distance between the intersections of the generated hyperbolae and the points corresponding to the positions of the receivers.

8. A method according to claim 1, wherein the processing to determine the positions of the objects by relating the calculated intersections of the generated hyperbolae to the generated direct-reflected signal time reception measurements comprises:

calculating an objective number by evaluating at least one testing function of the direct-reflected signal time reception measurements;

for each of a plurality of combinations of possible object positions identified from the hyperbolae, evaluating at least one hypothesis function corresponding to the testing function to calculate an hypothesised number for the combination of possible object positions; and selecting the combination of possible object positions for which the difference between the hypothesised number and the objective number is smallest.

9. A method according to claim 8, wherein the objective number is calculated by evaluating a testing function comprising at least one direct-reflected signal time reception measurement for each object and at least one direct-reflected signal time reception measurement for each receiver.

10. Apparatus for determining the positions of a plurality of objects by processing signals emitted from at least one transmitter, reflected by the objects and received by a plurality of receivers, the apparatus comprising:

an object-receiver pair time difference of arrival calculator operable to process signals from the receivers to generate a respective object-receiver pair time difference of arrival measurement for each object and each pair of receivers comprising the time difference of arrival between the signals received at each of the receivers in the pair from the object;

an hyperbolae processor operable to process the generated object-receiver pair time difference of arrival measurements to calculate a respective hyperbola for each object and each pair of receivers with the positions of the receivers as foci points and the hyperbola defining the set of possible positions for the object, and further operable to calculate the intersections of the generated hyperbolae and identify the intersections corresponding to possible positions for each individual object, wherein each possible position is either a true position or a phantom position;

a direct-reflected signal time difference calculator operable to process signals from the receivers to generate a direct-reflected signal time reception measurement for each receiver-object pair comprising the time difference between the reception by the receiver of the direct signal from the transmitter and the reception by the receiver of the signal reflected by the object; and a time measurement associator operable to associate the generated direct-reflected signal time reception measurements with the generated object-receiver pair time difference of arrival measurements to generate measurement association results, and further operable to determine the true positions of the objects by relating the calculated intersections of the generated hyperbolae to the generated direct-reflected signal time reception measurements using the measurement association results.

11. Apparatus according to claim 10, wherein the object-receiver pair time difference of arrival calculator is operable to generate the object-receiver pair time difference of arrival measurements by performing cross-correlation of the signals from the receivers.

12. Apparatus according to claim 10, wherein the direct-reflected signal time difference calculator is operable to generate the direct-reflected signal time reception measurements by performing auto-correlation of the signals from the receivers.

13. Apparatus according to claim 10, wherein the time measurement associator comprises:

a measurement combiner operable to combine the direct-reflected signal time reception measurements for the same object, to generate a first set of combined values;

a combined value calculator operable to calculate object-receiver pair time difference of arrival combined values corresponding to the direct-reflected signal time reception combined values, thereby generating a second set of combined values; and a comparer operable to compare the first and second sets of combined values to associate the direct-reflected signal time reception measurements with the object-receiver pair time difference of arrival measurements.

14. Apparatus according to claim 13, wherein the measurement combiner is operable to combine the direct-reflected signal time reception measurements by calculating, for each object and each pair of receivers, the difference between the direct-reflection signal time reception measurement for the object and the first receiver in the pair and the direct-reflected signal time reception measurement for the object and the second receiver in the pair.

15. Apparatus according to claim 13, wherein the combined value calculator is operable to calculate the values in dependence upon the calculated intersections of the generated hyperbolae.

16. Apparatus according to claim 15, wherein the combined value calculator is operable to calculate the values in dependence upon the distance between the intersections of the generated hyperbolae and the points corresponding to the positions of the receivers.

17. Apparatus according to claim 10, wherein the time measurement associator comprises:
   an objective number calculator operable to calculate an objective number by evaluating at least one testing function of the direct-reflected signal time reception measurements;
   an hypothesised number calculator operable to evaluate, for each of a plurality of combinations of possible object positions identified from the hyperbolae, at least one hypothesis function corresponding to the testing function to calculate an hypothesised number for the combination of possible object positions; and
   a selector operable to select the combination of possible object positions for which the difference between the hypothesised number and the objective number is smallest.

18. Apparatus according to claim 17, wherein the objective number calculator is operable to calculate the objective number by evaluating a testing function comprising at least one direct-reflected signal time reception measurement for each object and at least one direct-reflected signal time reception measurement for each receiver.

19. A computer-readable medium having computer-readable instructions stored thereon that, if executed by a computer, cause the computer to determine the positions of a plurality of objects by processing signals emitted from at least one transmitter, reflected by the objects and received by a plurality of receivers, by performing processing operations copmrising:
   processing signals from the receivers to generate a respective object-receiver pair time difference of arrival measurement for each object and each pair of receivers comprising the time difference of arrival between the signals received at each of the receivers in the pair from the object;
   processing the generated object-receiver pair time difference of arrival measurements to calculate a respective hyperbola for each object and each pair of receivers with the positions of the receivers as foci points and the hyperbola defining the set of possible positions for the object;
   calculating the intersections of the generated hyperbolae and identifying the intersections corresponding to possible positions for each individual object, wherein each possible position is either a true position or a phantom position;
   processing signals from the receivers to generate a direct-reflected signal time reception measurement for each receiver-object pair comprising the time difference between the reception by the receiver of the direct signal from the transmitter and the reception by the receiver of the signal reflected by the object;
   associating the generated direct-reflected signal time reception measurements with the generated object-receiver pair time difference of arrival measurements to generate measurement association results; and
   determining the true positions of the objects by relating the calculated intersections of the generated hyperbolae to the generated direct-reflected signal time reception measurements using the measurement association results.

20. A computer-readable medium according to claim 19, wherein the computer-readable instructions, if executed, cause the computer to perform the processing to associate the generated direct-reflected signal time reception measurements with the generated object-receiver pair time difference of arrival measurements by:
   combining the direct-reflected signal time reception measurements for the same object, to generate a first set of combined values;
   calculating object-receiver pair time difference of arrival combined values corresponding to the direct-reflected signal time reception combined values, thereby generating a second set of combined values; and
   comparing the first and second sets of combined values to associate the direct-reflected signal time reception measurements with the object-receiver pair time difference of arrival measurements.

21. A computer-readable medium according to claim 20, wherein the computer-readable instructions, if executed, cause the computer to combine the direct-reflected signal time reception measurements by calculating, for each object and each pair of receivers, the difference between the direct-reflection signal time reception measurement for the object and the first receiver in the pair and the direct-reflected signal time reception measurement for the object and the second receiver in the pair.

22. A computer-readable medium according to claim 20, wherein the computer-readable instructions, if executed, cause the computer to calculate the object-receiver pair time difference of arrival combined values in dependence upon the calculated intersections of the generated hyperbolae.

23. A computer-readable medium according to claim 22, wherein the computer-readable instructions, if executed, cause the computer to calculate the object-receiver pair time difference of arrival combined values in dependence upon the distance between the intersections of the generated hyperbolae and the points corresponding to the positions of the receivers.

24. A computer-readable medium according to claim 19, wherein the computer-readable instructions, if executed, cause the computer to perfoim the processing to determine the positions of the objects by relating the calculated intersections of the generated hyperbolae to the generated direct-reflected signal time reception measurements by:
   calculating an objective number by evaluating at least one testing function of the direct-reflected signal time reception measurements;
   for each of a plurality of combinations of possible object positions identified from the hyperbolae, evaluating at least one hypothesis function corresponding to the testing function to calculate an hypothesised number for the combination of possible object positions; and
   selecting the combination of possible object positions for which the difference between the hypothesised number and the objective number is smallest.

25. A computer-readable medium according to claim 24, wherein the computer-readable instructions, if executed, cause the computer to calculate the objective number by evaluating a testing function comprising at least one direct-reflected signal time reception measurement for each object and at least one direct-reflected signal time reception measurement for each receiver.

* * * * *